United States Patent
Müller et al.

(10) Patent No.: US 8,613,381 B2
(45) Date of Patent: Dec. 24, 2013

(54) TRUCK MIXER

(75) Inventors: Thomas Müller, Dürmentigen (DE); Martin Wittig, Biberach (DE)

(73) Assignee: Liebherr-Mischtecknik GmbH, Bad Schussenried (DE)

(*) Notice: Subject to any disclaimer, the term of this patent is extended or adjusted under 35 U.S.C. 154(b) by 486 days.

(21) Appl. No.: 12/752,326

(22) Filed: Apr. 1, 2010

(65) Prior Publication Data

US 2010/0252596 A1    Oct. 7, 2010

(30) Foreign Application Priority Data

Apr. 6, 2009  (DE) .................. 20 2009 004 729 U

(51) Int. Cl.
*B60R 9/00*   (2006.01)

(52) U.S. Cl.
USPC .......... 224/401; 224/281; 224/282; 224/553; 224/554

(58) Field of Classification Search
USPC .......... 224/401, 42.31, 42.32, 545, 548, 553, 224/567, 310, 281, 282, 554; 193/10
See application file for complete search history.

(56) References Cited

U.S. PATENT DOCUMENTS

| | | | | |
|---|---|---|---|---|
| 358,440 A * | 3/1887 | Fry et al. | ............. | 86/29 |
| 2,488,292 A * | 11/1949 | Hilkemeier | .............. | 193/10 |
| 2,968,382 A * | 1/1961 | Oury | ................ | 193/10 |
| 3,580,440 A * | 5/1971 | Fry et al. | ............ | 224/42.31 |
| 3,774,741 A * | 11/1973 | Johnson | .............. | 193/10 |
| 3,930,567 A * | 1/1976 | Sims | ................ | 193/10 |
| 5,154,488 A * | 10/1992 | Maxon, III | ............... | 298/7 |
| 5,884,824 A * | 3/1999 | Spring, Jr. | .............. | 224/310 |
| 6,158,638 A * | 12/2000 | Szigeti | .............. | 224/310 |
| 6,679,407 B2 * | 1/2004 | Weeks | .............. | 224/310 |
| 7,033,066 B2 * | 4/2006 | Helder | ............... | 366/68 |

FOREIGN PATENT DOCUMENTS

DE         3107196 A1    9/1982

* cited by examiner

*Primary Examiner* — Justin Larson
(74) *Attorney, Agent, or Firm* — Dilworth & Barrese, LLP

(57) ABSTRACT

The present invention relates to a truck mixer with at least one extension chute which for transport can be received on a holding means in a locked manner, wherein the holding means can be swiveled rotatorily and/or translatorily between a transport position and a removal position.

19 Claims, 3 Drawing Sheets

A-A

B-B

TRUCK MIXER

BACKGROUND OF THE INVENTION

This invention relates to a truck mixer with at least one extension chute which for transport can be received on a holding means in a locked manner.

In the rear open region of their mixing drum, truck mixers have a discharge funnel below which a so-called swivel chute is arranged. This is a chute which is pivotally mounted to the truck mixer at the rear end of the vehicle. To extend this swivel chute arranged below the discharge funnel, one or more extension chutes are used. When unloading the drum contents of the truck mixer, the extension chute is hung into the end of the swivel chute. The extension chute can consist of several parts, which during transport usually are fixed on the rear fenders of the truck mixer. On the rear fenders, the extension chutes are retained on correspondingly provided chute supports. The chute supports are sheet metal strips firmly arranged on the rear fenders of the truck mixer, which partly are adapted to the outer shape of the extension chute, so that after correspondingly locking the same by a so-called chute holder, the extension chutes are firmly held in their position on the rear fenders.

This holding situation is shown in FIGS. 1 to 4 of the attached drawings. The truck mixer 10 shown here only in part includes a usual mixing drum 12. In the rear region of the chassis of the truck mixer the discharge funnel 14 is arranged, below which the swivel chute 16 is pivotally arranged. On rear fenders 18, extension chutes 20 are mounted on two chute supports 22 made of curved plates, wherein the extension chutes 20 are held in position by means of a chute holder 24. The chute holder 24 includes a tension spring (cf. FIG. 4), which retains the extension chute 20 on the chute supports by its spring force. As shown in FIG. 3, the chute supports 22 are connected with the fender 18 via screw connections.

For removing an extension chute 20, a number of working steps must now be performed:

1. First, the hook of the chute holder 24 must be lifted against the tension spring and must be deposited at the side.

2. For removal, the extension chute 20 must then be removed from the chute supports 22 and be rotated against the stop of the chute support in the chute support 22.

3. Thereafter, the extension chute must be removed from the chute support 22 by the operating personnel by a vertical upward movement.

4. For depositing the extension chute 20, these working steps must be performed in reverse order.

This handling of the extension chute is quite laborious. It should be considered that the mounting height of the chute support is dependent on the vehicle height and the fender attachment. This means that the chute support is located at a height of 1.30 m to 1.60 m. For supporting the chute on the fender, the operator must lift the extension chute with a weight of up to 20 kg to a height of 1.50 m to 1.80 m, so that he can position the extension chute in the extension chute holder. On a truck mixer, up to four extension chutes can now be supported on the fenders. For comparatively small or weaker operators, this means a considerable exertion.

Due to the open construction of the extension chute holder on the fender of the truck mixer, a high cleaning effort is necessary. In addition, the open construction of the chute support and chute holder on the fender is not optically appealing either.

SUMMARY OF THE INVENTION

Therefore, it is the object of the present invention to provide for an easier removal of the extension chutes from their transport position and an easier locking of the extension chutes in the transport position.

In accordance with the invention, this object is solved by a truck mixer with the features herein.

In a generic truck mixer with the features of the characterizing part of claim 1, a holding means for the extension chutes accordingly is provided, which can be swiveled rotatorily and/or translatorily between a transport position and a removal position. Via the rotatorily and/or translatorily movable holding means it thus becomes possible to move the extension chute from the transport position into a lower and hence comfortable removal position. As a result, it is possible to remove the extension chute at an ergonomic height.

Preferred aspects of the invention can be taken from the description herein.

Accordingly, the at least one holding means is guided in a guideway.

Advantageously, the holding means can be arranged on a rear fender of the truck mixer.

Particularly advantageously, the holding means can be moved and/or swiveled electrically, pneumatically or hydraulically. However, the holding means can of course also be moved by muscular power.

In accordance with a further advantageous aspect, each of the holding means arranged at a distance from each other has one extension chute each. The number of holding means here depends on the length of the respective extension chute.

In particular with regard to the optical appearance, but also with regard to the cleaning possibility it is advantageous when the holding means each consist of a section which is adapted to the shape of the extension chute to be received.

Furthermore, the holding means on one side can engage over the inserted extension chute by means of a hook-shaped protrusion, whereas the opposite side is locked by means of a manually releasable latching mechanism.

BRIEF DESCRIPTION OF THE DRAWINGS

Further features, details and advantages of the invention will be explained in detail with reference to an embodiment illustrated in the drawing, in which.

DESCRIPTION OF THE PREFERRED EMBODIMENTS

Figure 1:
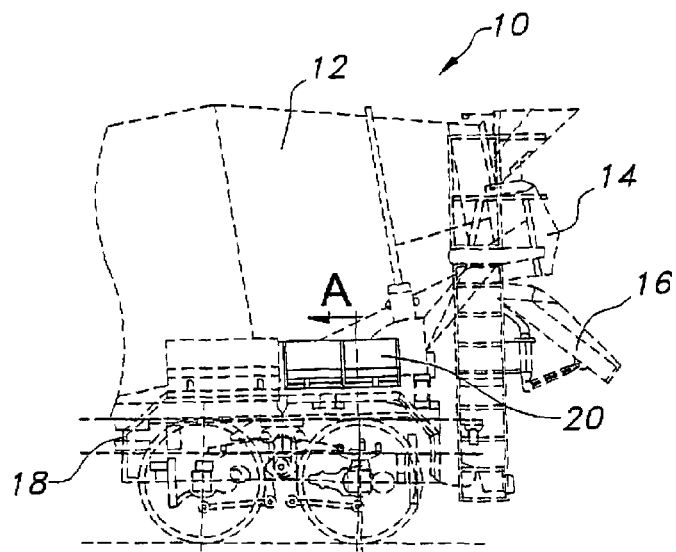
FIGS. 1 to 4: show representations of a truck mixer with extension chute according to the prior art.
Figure 2:
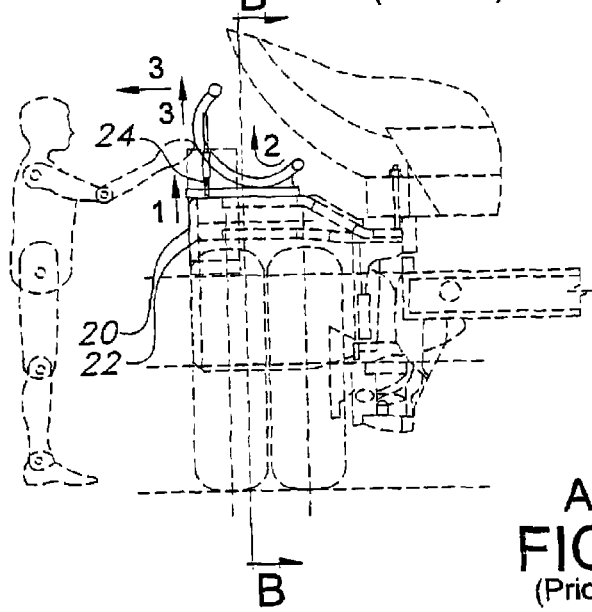
Figure 3:
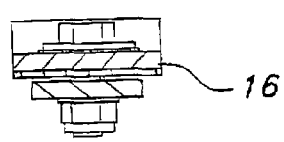
Figure 4:
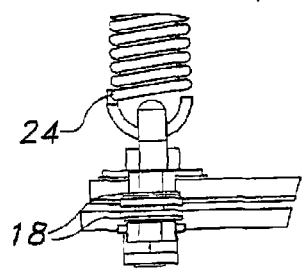
Figure 5:
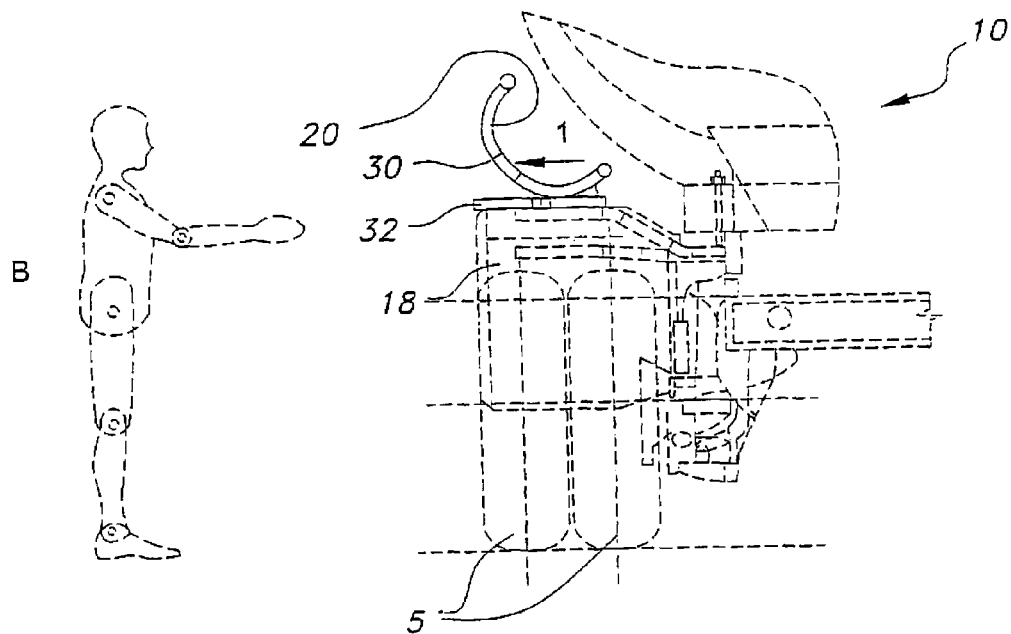
FIGS. 5 to 8: show detailed representations of a part of a truck mixer with a chute holder of the invention in accordance with a first embodiment of the present invention.

FIGS. 5 to 8 each show a detail of a truck mixer 10. There is each shown the left-hand tail region with the fender 18 covering the tail wheels 5. On the fender 18 an extension chute 20 is arranged. As shown in FIG. 5, the extension chute 20 is held in holding means 30, a plurality of which are arranged on the fender 18 distributed along the length of the extension chute 20. The structure of the holding means 30 can be taken in particular from FIG. 8, in which the extension chute 20 has already been removed. As can be taken from this Figure, the extension chute substantially is a U-shaped sheet-metal part. The same is guided in a guideway 32 such that it can be moved and swiveled translatorily and/or rotatorily between a transport position (cf. FIG. 5) and a removal position (cf. FIG. 8).

For this purpose, the holding means 30 includes a swivel bolt 34 guidable in the guideway 32. Furthermore, additional bolts 36 are provided on the holding means, which can releasably be received in a bolt receptacle 38 movably arranged in the guideway. This releasable reception serves the purpose that the holding means 30 initially can translatorily be moved over a certain region in the guideway 32 (cf, FIGS. 5 and 6). After reaching an end position at the edge of the guideway 32 (cf. FIG. 6), the receptacle 38 then releases the corresponding bolts 36, so that the holding means 30 can be swiveled about the swivel bolts 34 (cf. FIG. 7).

Figure 6:
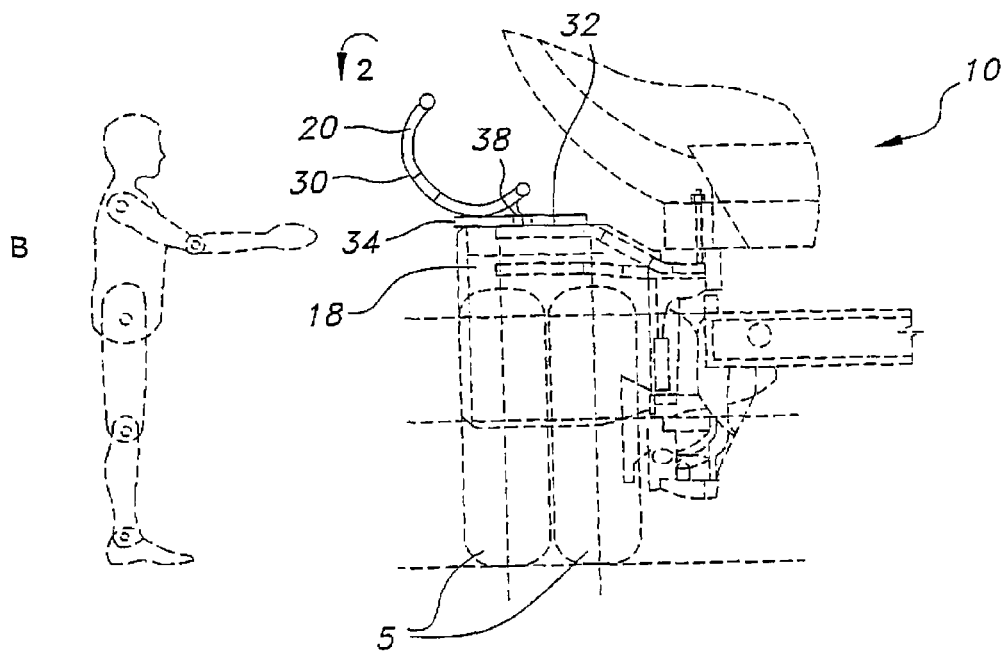

The bolt receptacle 38 can be formed in any desired way. It is only important that it can safely retain the bolts 36 in the guideway 32 during the translatory movement and will only release the same after reaching the end position as shown in FIG. 6, so that the holding means 20 can be swiveled about the swivel pins 34. On the other hand, when the holding means 30 is turned in reverse direction, the holder 38 must again be able to safely receive the swivel pin 36, so that the holder can be moved in the guideway.

With reference to the sequence of representations shown in FIGS. 5 to 8, the removal of an extension chute by an operator B can be explained. In FIG. 5, the extension chute is shown in its transport position. It can translatorily be shifted by the operator B in direction of arrow 1, until the position shown in FIG. 6 is reached. In this position, the extension chute 20 is swiveled in direction of arrow 2 about the swivel bolts 34, with the bolts 36 being released from the holder 38.

Figure 7:
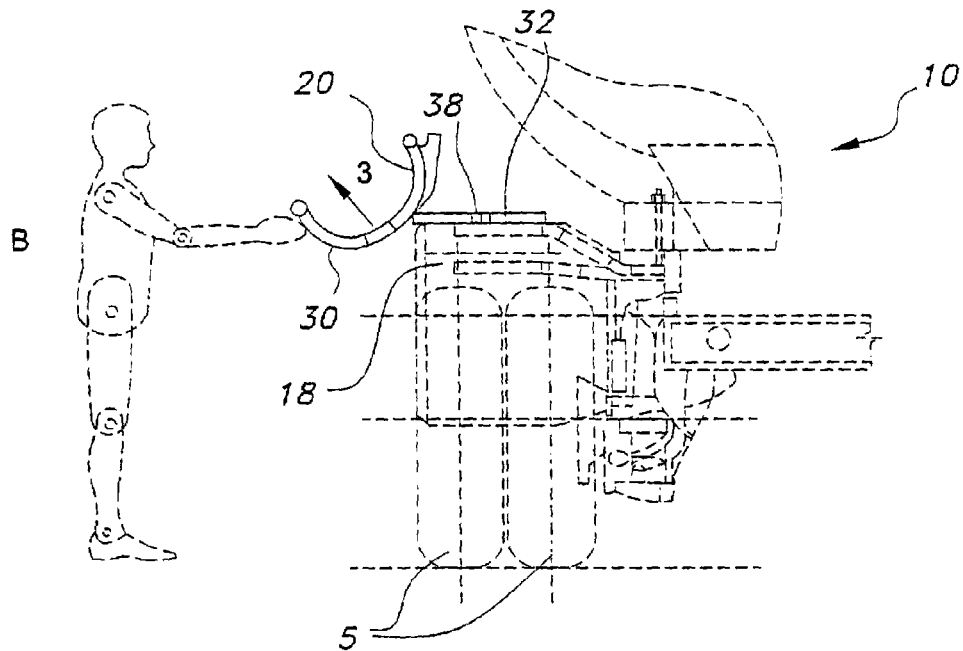

In FIG. 7, the holding means 30 has already been swiveled together with the extension chute 20. From this position swiveled down, the extension chute 20 can be removed by the operator B in direction of arrow 3.

Figure 8:
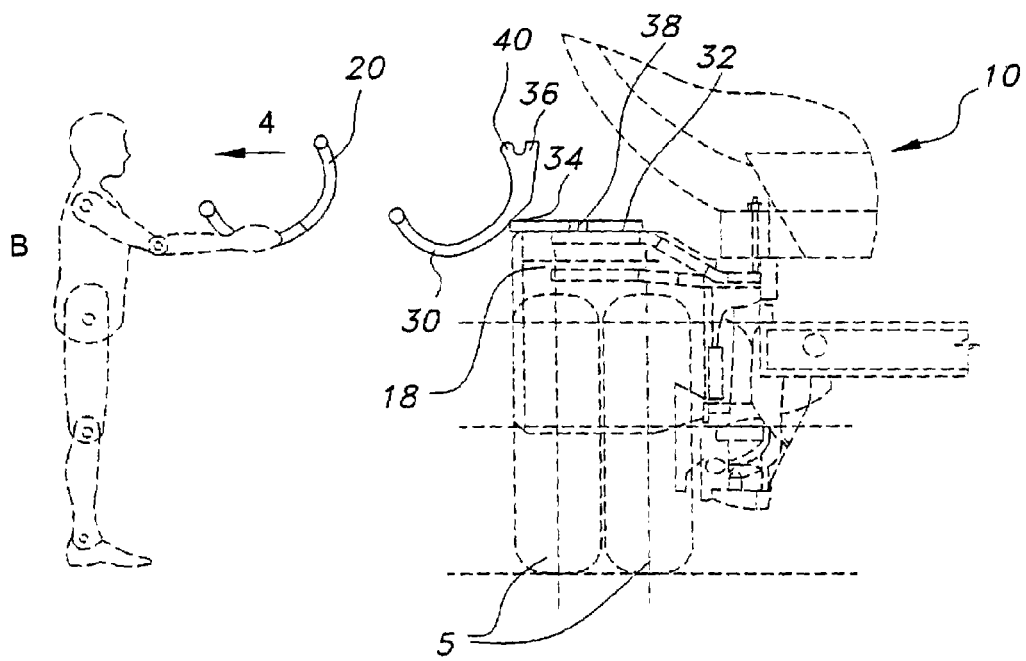

In FIG. 8, the removed extension chute 20 is shown, which has been removed from the holding means 30 in direction of arrow 4.

As can be taken from the sequence of FIGS. 5 to 8, the operator B can remove the extension chute 20 from the transport position much more easily, since the same can be moved together with the holding means 30 into a position facing the operator B, wherein this removal position additionally is lowered with respect to the height of the fender 18 of the truck mixer.

For receiving the extension chute 20 in the holding means 30, the same have a hook-shaped protrusion 40 on the one side, whereas on the opposite side a non-illustrated locking mechanism is provided for locking the extension chute in the holding means 30.

The invention claimed is:

1. A truck mixer with at least one extension chute and at least one holding means, wherein the extension chute is received on the at least one holding means in a locked manner, and wherein the holding means is translationally movable between a transport position and a removal position and rotationally swiveled, wherein the holding means is guided in a guideway for translationally moving said holding means, and wherein the holding means includes at least one swivel bolt translationally movable in the guideway, said holding means being pivotally mounted by means of the swivel bolt(s), and further comprising additional bolts releasably received in a bolt receptacle movably arranged in the guideway, said bolt receptacle releasing the additional bolts when the holding means reaches the removal position at an edge of the guideway to permit the holding means to be swiveled about the swivel bolt(s).

2. The truck mixer according to claim 1, wherein the holding means on one side can engage over the inserted extension chute by a hook-shaped protrusion, whereas the opposite side is locked by a manually releasable latching mechanism.

3. The truck mixer according to claim 1, including a plurality of the holding means each of which holds the at least one extension chute.

4. The truck mixer according to claim 1, wherein the holding means can be moved and/or swiveled electrically, pneumatically or hydraulically.

5. The truck mixer according to claim 4, including a plurality of the holding means each of which holds the at least one extension chute.

6. The truck mixer according to claim 1, including a plurality of the holding means each of which holds the at least one extension chute.

7. The truck mixer according to claim 6, wherein the number of the holding means holding the at least one extension chute depends on the length of the respective extension chute.

8. The truck mixer according to claim 1, wherein the holding means can be moved and/or swiveled electrically, pneumatically or hydraulically.

9. The truck mixer according to claim 8, including a plurality of the holding means each of which holds the at least one extension chute.

10. The truck mixer according to claim 1, wherein the holding means is arranged on a rear fender of the truck mixer.

11. The truck mixer according to claim 10, including a plurality of the holding means each of which holds the at least one extension chute.

12. The truck mixer according to claim 10, wherein the holding means can be moved and/or swiveled electrically, pneumatically or hydraulically.

13. The truck mixer according to claim 12, including a plurality of the holding means each of which holds the at least one extension chute.

14. The truck mixer according to claim 13, wherein the holding means each are composed of a section which is adapted to the shape of the extension chute to be received.

15. The truck mixer according to claim 1, wherein the holding means is arranged on a rear fender of the truck mixer.

16. The truck mixer according to claim 15, including a plurality of the holding means each of which holds the at least one extension chute.

17. The truck mixer according to claim 15, wherein the holding means can be moved and/or swiveled electrically, pneumatically or hydraulically.

18. The truck mixer according to claim 17, including a plurality of the holding means each of which holds the at least one extension chute.

19. The truck mixer according to claim 18, wherein the holding means each are composed of a section which is adapted to the shape of the extension chute to be received.

\* \* \* \* \*